United States Patent
Okamura et al.

(10) Patent No.: US 8,617,345 B2
(45) Date of Patent: *Dec. 31, 2013

(54) METHOD FOR BONDING RESIN MATERIALS CONTAINING OXYMETHYLENE POLYMER AND STRUCTURES

(75) Inventors: Akira Okamura, Mie (JP); Satoshi Nagai, Mie (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 601 days.

This patent is subject to a terminal disclaimer.

(21) Appl. No.: 12/517,418

(22) PCT Filed: Dec. 3, 2007

(86) PCT No.: PCT/JP2007/073343
§ 371 (c)(1),
(2), (4) Date: Sep. 23, 2009

(87) PCT Pub. No.: WO2008/069182
PCT Pub. Date: Jun. 12, 2008

(65) Prior Publication Data
US 2010/0021752 A1 Jan. 28, 2010

(30) Foreign Application Priority Data

Dec. 4, 2006 (JP) ................................. 2006-327653

(51) Int. Cl.
*B32B 27/06* (2006.01)
*B32B 37/06* (2006.01)
*B29C 47/00* (2006.01)

(52) U.S. Cl.
USPC ........ 156/325; 428/500; 156/308.2; 156/242; 156/244.11

(58) Field of Classification Search
USPC ........... 428/500; 156/308.2, 242, 244.11, 325
See application file for complete search history.

(56) References Cited

U.S. PATENT DOCUMENTS

| 4,816,107 A | 3/1989 | Collins et al. |
| 4,954,400 A | 9/1990 | Collins et al. |
| 2001/0007006 A1 * | 7/2001 | Tanimura et al. ............. 525/398 |
| 2003/0125512 A1 | 7/2003 | Nakamura et al. |
| 2010/0041854 A1 | 2/2010 | Okamura et al. |

FOREIGN PATENT DOCUMENTS

| EP | 0 308 187 A2 | 3/1989 |
| EP | 0 364 207 A2 | 4/1990 |
| EP | 1 275 671 A1 | 1/2003 |
| JP | 1 132638 | 5/1989 |
| JP | 2 166184 | 6/1990 |
| JP | 8 60125 | 3/1996 |
| JP | 08 060125 | 3/1996 |
| JP | 2008-138331 | 6/2008 |
| WO | 02 077049 | 10/2002 |

OTHER PUBLICATIONS

U.S. Appl. No. 12/517,472, filed Jun. 3, 2009, Okamura, et al.
Extended European Search Report issud Jul. 21, 2011, in Patent Application No. 07832963.8.

* cited by examiner

*Primary Examiner* — Michael Orlando
*Assistant Examiner* — Daniel Lee
(74) *Attorney, Agent, or Firm* — Oblon, Spivak, McClelland, Maier & Neustadt, L.L.P.

(57) ABSTRACT

Provided are a method of bonding resin materials for bonding a resin material (X) containing an oxymethylene-based polymer (A) and a resin material (Y), and a structure obtained by the bonding method. The method includes preparing as the resin material (Y) a low-melting-point oxymethylene-based polymer (B) having a melting point lower than that of the oxymethylene-based polymer (A) by 5 to 50° C., or preparing as the resin material (Y) the resin material (X) or another resin material, and providing the low-melting-point oxymethylene-based polymer (B) between the resin material (Y) and the resin material (X) and heating resin materials.

12 Claims, No Drawings

METHOD FOR BONDING RESIN MATERIALS CONTAINING OXYMETHYLENE POLYMER AND STRUCTURES

TECHNICAL FIELD

The present invention relates to a method of bonding resin materials each containing an oxymethylene-based polymer, the method involving using an oxymethylene-based polymer having a specific melting point for bonding the resin materials, and a structure (a structural body) obtained by the bonding method.

BACKGROUND ART

In recent years, to cope with environmental problems on the global scale, and in order to prevent industrial wastes from contaminating the environment, reductions in a necessary heat quantity and a $CO_2$ amount to be generated at the time of a thermal disposal have been attracting attention. As a result, there has been growing interest in recovery and recycling of materials.

Oxymethylene-based polymers are each an aliphatic ether type polymer or a polymer mainly composed of an aliphatic ether, and are each mainly derived from methanol as a raw material which a person can obtain without being in dependence on petroleum, so each of the polymers is considered to be a material that places a light load on an environment. The polymers are excellent materials that have been widely used in engineering plastics at present because of their high mechanical characteristics such as rigidity.

Known examples of the method of bonding resin materials each containing an oxymethylene-based polymer include: a method involving subjecting the materials to ultrasonic fusion in consideration of the fact that the surface of each of the materials is chemically inert; and a method involving roughening the surface of each of the oxymethylene-based polymers in advance or modifying the surface with an electron beam or by a plasma treatment in advance and bonding the materials with a cyanoacrylate-based adhesive or an epoxy-based adhesive. The former method requires a complicated step or a complicated facility, and is applicable only to part of the injection-molded articles. In addition, the latter method involves the following problems: the method cannot provide a sufficient bonding effect on the materials, and is not preferable in terms of recycling property because a component except the oxymethylene-based polymers must be used. In view of the foregoing, a technique for bonding resin materials each containing an oxymethylene-based polymer with a material composed of an oxymethylene-based polymer of the same kind has been desired.

The application of an oxymethylene-based amorphous copolymer (see Patent Document 1) or a copolymer having a low melting point (see Patent Document 2) to the bonding of oxymethylene-based polymers has been proposed. The application of the former material shows insufficient practicability because a bonding strength between the polymers is not sufficient, and the amorphous copolymer has so low a melting point that a product obtained after the bonding is poor in heat resistance. On the other hand, a bonding strength between the polymers in the case of the application of the latter material is significantly improved as compared to that in the case of the application of the former material, and a bonding component, that is, the latter material has improved heat resistance as compared to that of the former material, but a product obtained after the bonding is still so poor in heat resistance that the product cannot be used in the same environment as an environment where a conventional oxymethylene-based polymer has been used.

In addition, an oxymethylene-based polymer is a resin having high crystallinity, so the polymer involves the following problem: upon bonding of injection-molded articles, extrusion-molded articles, or stretched materials each containing the polymer, a heat history for the bonding at a high temperature or for a long period of time results in the thermal contraction of each of the polymers more than expected, and, furthermore, the melting of the raw material for any such article or material except the oxymethylene-based polymer cannot be ignored, with the result that a structure accurately maintaining its shape cannot be produced.

The inventors of the present invention have already developed an oxymethylene copolymer having a large comonomer content. The copolymer has a moderately low melting point as compared to that of the conventional oxymethylene copolymer, but the inventors have not referred to anything about the effectiveness of the copolymer as an adhesive (see Patent Document 3).

Patent Document 1: JP 01-132638 A
Patent Document 2: JP 08-60125 A
Patent Document 3: WO 2002-077049 A

DISCLOSURE OF THE INVENTION

Problem to be Solved by the Invention

An object of the present invention is to provide a method of boding resin materials each containing an oxymethylene-based polymer by which adhesiveness between the resin materials can be improved, and the thermal contraction and thermal deformation of a structure obtained by the bonding method can be suppressed, and a structure obtained by the bonding method.

Means for Solving the Problems

The inventors of the present invention have made extensive studies with a view to solving the above-mentioned problems. As a result, the inventors have conceived the present invention in which, upon bonding of resin materials each containing an oxymethylene-based polymer, heat treatment is performed by using a resin material containing an oxymethylene-based polymer having a specific difference in melting point with respect to the melting point of the oxymethylene-based polymer in one of the resin materials as (1) the other material or (2) a bonding layer. Then, as a result, the inventors have found that adhesiveness between the materials can be improved without the occurrence of a problem such as the thermal contraction or thermal deformation.

The present invention provides a method of bonding resin materials for bonding a resin material (X) containing an oxymethylene-based polymer (A) and a resin material (Y), including: preparing as the resin material (Y) a low-melting-point oxymethylene-based polymer (B) having a melting point lower than a melting point of the oxymethylene-based polymer (A) by 5 to 50° C.; or preparing as the resin material (Y) the resin material (X) or another resin material and providing the low-melting-point oxymethylene-based polymer (B) between the resin material (Y) and the resin material (X); and heating the resin materials.

In addition, the present invention provides a structure obtained by the above-mentioned bonding method.

Effects of the Invention

According to the present invention, there can be provided a method of boding resin materials each containing an oxymethylene-based polymer by which adhesiveness between the resin materials can be improved, and the thermal contraction and thermal deformation of a structure can be suppressed, and a structure obtained by the bonding method.

BEST MODE FOR CARRYING OUT THE INVENTION

[Method of Bonding Resin Materials]

A method of bonding resin materials of the present invention is a method of bonding a resin material (X) containing an oxymethylene-based polymer (A) and a resin material (Y) by heat treatment. Hereinafter, various materials and a condition for heat treatment will be described.

(Resin Material (X) Containing Oxymethylene-Based Polymer (A))

Examples of the oxymethylene-based polymer (A) include oxymethylene homopolymers and oxymethylene block copolymers generally available in the market. Of those, the oxymethylene-based polymer (A) including a repeating unit represented by the following general formula (1) and a copolymerized product of trioxane and one or more kinds of comonomers in an amount of 0.5 to 30.0 parts by mass with respect to 100 parts by mass of trioxane is preferable. The amount of the comonomers with respect to 100 parts by mass of trioxane is more preferably 0.5 to 10.0 parts by mass.

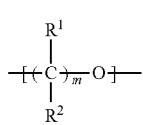

(1)

In the above formula (1), $R^1$ and $R^2$ each independently represent a hydrogen atom, an alkyl group, an organic group having an alkyl group, a phenyl group, or an organic group having a phenyl group, and m represents an integer of 1 to 6. The alkyl group is, for example, an alkyl group having 1 to 8 carbon atoms.

Examples of the above comonomers include a cyclic formal and a cyclic ether. Specific preferable examples of the comonomers include: 1,3-dioxolane and a derivative of 1,3-dioxolane; 1,3-dioxepane and a derivative of 1,3-dioxepane; 1,3,5-trioxepane and a derivative of 1,3,5-trioxepane; 1,3,6-trioxocane and a derivative of 1,3,6-trioxocane; and a monofunctional glycidyl ether.

The content of the oxymethylene-based polymer (A) in the resin material (X) is preferably 50 vol % or more; the resin material (X) is more preferably composed of the oxymethylene-based polymer (A).

(Resin Material (Y))

A low-melting-point oxymethylene-based polymer (B) in the resin material (Y) has a melting point lower than that of the oxymethylene-based polymer (A) by 5 to 50° C., or preferably 10 to 30° C. When the difference in melting point between the polymers is smaller than 5° C., the temperature at which the materials are to be bonded to each other is extremely close to the melting point of the oxymethylene-based polymer (A), so the extent to which the material containing the oxymethylene-based polymer (A) thermally contracts enlarges, and, in worse cases, the material may thermally deform or melt to deteriorate the shape of a product obtained after the bonding. On the other hand, when the difference in melting point is larger than 50° C., as described above, the product obtained after the bonding is poor in heat resistance, or a sufficient bonding strength between the materials cannot be obtained in some cases.

The low-melting-point oxymethylene-based polymer (B) is preferably a copolymerized product of trioxane and one or more kinds of comonomers in an amount of 10.0 to 50.0 parts by weight with respect to 100 parts by weight of trioxane, the copolymerized product being represented by the general formula (1) as in the case of the foregoing.

When the resin material (Y) contains the low-melting-point oxymethylene-based polymer (B), the content of the polymer (B) is preferably 50 vol % or more; the material is preferably constituted only of the polymer (B).

In addition, when the resin material (Y) is free of the low-melting-point oxymethylene-based polymer (B), that is, when the low-melting-point oxymethylene-based polymer (B) serves as a bonding layer for bonding the resin material (X) and the resin material (Y), any other material may be used in combination with the resin materials as long as the other material is mainly composed of the polymer (B).

It should be noted that the resin material (Y) when the low-melting-point oxymethylene-based polymer (B) is used as a bonding layer may be a material identical to or different from the resin material (X). Examples of the material different from the resin material (X) include a material different from the resin material (X) in content of the oxymethylene-based polymer (A) and a material containing a different component as that of the resin material (X) except the oxymethylene-based polymer (A).

(Condition for Heat Treatment)

The condition for heat treatment (condition for the bonding) is preferably as follows: the treatment is performed at a temperature lower than the melting point of the oxymethylene-based polymer (A) and equal to or higher than a temperature obtained by subtracting 20° C. from the melting point of the low-melting-point oxymethylene-based polymer (B). When heat treatment is performed at a temperature lower than the above melting point, the thermal contraction of the material containing the oxymethylene-based polymer (A) is suppressed, and the material can be prevented from thermally deforming or melting to deteriorate the shape of a product obtained after the bonding. In addition, when heat treatment is performed at a temperature equal to or higher than the temperature obtained by subtracting 20° C. from the melting point of the low-melting-point oxymethylene-based polymer (B), a sufficient bonding strength can be imparted to the materials.

It should be noted that a known additive or filler can be added to the material containing an oxymethylene-based polymer of the present invention, which contains mainly the above oxymethylene-based polymer, to such an extent that an original object of the present invention is not impaired.

Examples of the additive include a crystal nucleating agent, an antioxidant, a plasticizer, a delustering agent, a foaming agent, a lubricant, a release agent, an antistatic agent, a UV absorber, a light stabilizer, a heat stabilizer, a deodorant, a flame retardant, a sliding agent, a perfume, and an antibacterial agent. In addition, examples of the filler include a glass fiber, talc, mica, calcium carbonate, and a potassium titanate whisker. Further, a pigment or a dye can be added to the material in order that the material may be finished in a desired color. In addition, the material can be denatured by adding, for example, any one of various monomers, a coupling agent, a terminal treating agent, any other resin, wood dust, or starch.

Further, the form of each of the resin material (X) and the resin material (Y) according to the present invention is not limited; each of the materials is preferably an injection-molded article, an extrusion-molded article, a stretch-molded article, or a molded article obtained by the secondary processing of each of the articles. Other examples of the form include, but not limited to, a blow-molded article, a film, a sheet, a fiber, a multifilament, a monofilament, a rope, a net, a fabric, a knitted fabric, a non-woven fabric, a filter, and a material obtained by the secondary processing of each of them. When the materials are thermally bonded to each other with the oxymethylene-based polymer (B) interposed between them, the manner in which the low-melting-point oxymethylene-based polymer (B) is interposed between the materials is preferably, for example, as follows: the low-melting-point oxymethylene-based polymer (B) is caused to be present in a layer shape or as a domain on the surface of the resin material (A) in advance.

Alternatively, irrespective of whether the polymer (B) is continuous (a layer shape, a rod shape, or a wavy shape) or discontinuous (a domain shape or a dot shape), the polymer may be placed in advance on the surface of the material containing the oxymethylene-based polymer (A) simultaneously with, or sequentially during, the primary processing of the material. The polymer (B) may be interposed between the materials during a process commencing on the completion of the primary processing of the material containing the oxymethylene-based polymer (A) and ending on the completion of the formation of a structure.

[Structure]

A structure of the present invention can be obtained by the method of bonding resin materials of the present invention described above. The structure shows good adhesiveness between resin materials each containing an oxymethylene-based polymer, and the thermal contraction and thermal deformation of the structure are suppressed.

Such structure may be used as it is, or may be additionally processed. For example, the structure can be turned into a structure in which at least one kind of a resin material containing the oxymethylene-based polymer (A) is constituted of multiple layers by repeating, or simultaneously performing, similar bonding operations. In addition, an additionally sophisticated structure can be formed by newly bonding a structure obtained by bonding resin materials to each other once to another resin material with a different shape containing the oxymethylene-based polymer (A).

For example, a layer structure when the structure is a multilayered fiber is as follows: the section of one fiber has two or more layers exposed to the surface of the fiber, and the components of which the layers are constituted are composed of at least the above two components, that is, the resin materials (X) and (Y). The ratio at which the layers are exposed to the surface is not particularly limited; the higher the ratio at which the resin material (Y) which has a low melting point and which functions as a bonding layer at the time of its secondary processing (in particular, the oxymethylene-based polymer (B) component) is exposed, the better a bonding strength between the materials (X) and (Y). Accordingly, the resin material (Y) may be formed into multiple layers separate from each other.

Hereinafter, the present invention will be described more specifically by way of examples. However, the present invention is not limited to the following specific examples.

It should be noted that materials used in the examples, a method of measuring a melting point, and a bonding method and a judgement criterion are shown below.

(Resin Material)

Each of a Iupital A40 (hereinafter referred to as "oxymethylene-based polymer (a)") and a Iupital F40 (hereinafter referred to as "oxymethylene-based polymer (b)") manufactured by Mitsubishi Engineering-Plastics Corporation and having melting points of 172° C. and 168° C., respectively, was used as the resin material (X) of each of the examples. Each of the oxymethylene-based polymers (a) and (b) was subjected to melt spinning to be processed into a multifilament having a stretch ratio of 4 and a single fiber fineness of 5 dtex.

A Iupital V40 (hereinafter referred to as "oxymethylene-based polymer (c)") manufactured by Mitsubishi Engineering-Plastics Corporation and having a melting point of 155° C. was used as the resin material (Y) of each of the examples. The oxymethylene-based polymer (c) was subjected to melt spinning to be processed into a multifilament having a stretch ratio of 1 and a single fiber fineness of 5 dtex.

It should be noted that, in the case of a comparative example, each of the oxymethylene-based polymers (a) and (b) may serve as the resin material (Y), or the oxymethylene-based polymer (c) may serve as the resin material (X).

(Method of Measuring Melting Point)

The temperature of a resin material was increased from 30° C. to 210° C. at a rate of 10° C./min, and the peak melting temperature of the material was measured with a differential scanning calorimeter (DSC6200 manufactured by Seiko Instruments Inc.) and defined as a melting point.

(Bonding Method and Judgement Criterion)

The multifilament of the resin material (X) was cut into a piece having a length of 10 cm. The piece was placed on an iron plate in a linear fashion. Next, the multifilament of the resin material (Y) was cut into a piece having a length of 3 cm. The piece was placed on the piece made of the resin material (X) so as to cross the piece, and the pieces were sandwiched between the above iron plate and another iron plate. The resultant was subjected to a thermal bonding treatment (heat treatment) with a hydraulic hot pressing device, which had been heated in advance to a temperature shown in Table 1 below, for a predetermined time under heat and pressure.

After the treatment, a state where the resin material (X) and the resin material (Y) were bonded to each other was visually observed, and whether or not each of the materials melted was observed. In addition, the length of the resin material (X) after the treatment was measured, and the percentage by which the material thermally contracted after the treatment as compared to its length before the treatment was measured.

EXAMPLES 1 TO 7

The resin material (X) and the resin material (Y) were bonded to each other by the above-mentioned bonding method under the conditions shown in Table 1 below. Table 1 shows the results of evaluation.

COMPARATIVE EXAMPLES 1 TO 12

The resin material (X) and the resin material (Y) were bonded to each other by the above-mentioned bonding method under the conditions shown in Table 1 below. Table 1 shows the results of evaluation.

TABLE 1

| | Resin material (X) [oxymethylene-based polymer (A)] | Resin material (Y) [oxymethylene-based polymer (B)] | Difference in melting point between (A) and (B) (° C.) | Hot pressing temperature (° C.) | Hot pressing time (min) | Bonding state | State of resin material (X) after hot pressing | Percentage by which resin material (X) contracted (%) |
|---|---|---|---|---|---|---|---|---|
| Example 1 | (a) | (c) | 17 | 150 | 90 | Bonded | Not melted | 2.9 |
| Example 2 | (a) | (c) | 17 | 155 | 60 | Bonded | Not melted | 3.0 |
| Example 3 | (a) | (c) | 17 | 155 | 90 | Bonded | Not melted | 4.9 |
| Example 4 | (a) | (c) | 17 | 160 | 30 | Bonded | Not melted | 8.7 |
| Example 5 | (b) | (c) | 12 | 150 | 90 | Bonded | Not melted | 6.9 |
| Example 6 | (b) | (c) | 12 | 155 | 90 | Bonded | Not melted | 7.1 |
| Example 7 | (b) | (c) | 12 | 160 | 30 | Bonded | Not melted | 7.2 |
| Comparative Example 1 | (a) | (a) | 0 | 160 | 60 | Not bonded | Not melted | — |
| Comparative Example 2 | (a) | (a) | 0 | 170 | 30 | Bonded | Melted to some extent | 12.2 |
| Comparative Example 3 | (a) | (a) | 0 | 175 | 30 | Bonded | Melted | 7.1 |
| Comparative Example 4 | (a) | (b) | 4 | 160 | 60 | Not bonded | Not melted | — |
| Comparative Example 5 | (a) | (b) | 4 | 170 | 30 | Bonded | Melted to some extent | 12.1 |
| Comparative Example 6 | (a) | (b) | 4 | 175 | 30 | Bonded | Melted | 7.1 |
| Comparative Example 7 | (b) | (b) | 0 | 160 | 60 | Not bonded | Melted to some extent | — |
| Comparative Example 8 | (b) | (b) | 0 | 170 | 30 | Bonded | Melted to some extent | 5.9 |
| Comparative Example 9 | (b) | (b) | 0 | 170 | 60 | Bonded | Melted | — |
| Comparative Example 10 | (c) | (c) | 0 | 150 | 90 | Bonded | Melted to some extent | — |
| Comparative Example 11 | (c) | (c) | 0 | 155 | 90 | Bonded | Melted | — |
| Comparative Example 12 | (c) | (c) | 0 | 160 | 30 | Bonded | Melted | — |

(a): A multifilament composed of a Iupital A40 having a melting point of 172° C.
(b): A multifilament composed of a Iupital F40 having a melting point of 168° C.
(c): A multifilament composed of a Iupital V40 having a melting point of 155° C.

The invention claimed is:

1. A method of bonding resin materials comprising a resin material (X) containing an oxymethylene-based polymer (A) and a resin material (Y), said method comprising:
   heat treating the resin materials (X) and (Y) such that bonding of the resin material (X) and the resin material (Y) occurs;
   wherein:
   the resin material (Y) is a low-melting-point oxymethylene-based polymer (B) having a melting point lower than the melting point of the oxymethylene-based polymer (A) by 5 to 50° C.; or
   the resin material (Y) is a material identical to or different from the resin material (X) and the low-melting-point oxymethylene-based polymer (B) is provided between the resin material (Y) and the resin material (X); and
   wherein the heat treating is performed at a temperature lower than the melting point of the oxymethylene-based polymer (A) and equal to or higher than a temperature obtained by subtracting 20° C. from the melting point of the low-melting-point oxymethylene-based polymer (B).

2. The method of bonding resin materials according to claim 1, wherein the low-melting-point oxymethylene-based polymer (B) has a melting point lower than the melting point of the oxymethylene-based polymer (A) by 10 to 30° C.

3. The method of bonding resin materials according to claim 1, wherein the oxymethylene-based polymer (A) comprises a repeating unit represented by formula (1) and is a copolymerized product of trioxane and one or more kinds of comonomers in an amount of 0.5 to 30.0 parts by mass with respect to 100 parts by mass of trioxane:

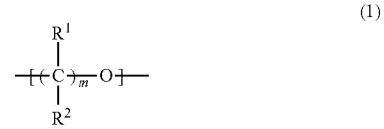

where $R^1$ and $R^2$ each independently represent a hydrogen atom, an alkyl group, an organic group having an alkyl group, a phenyl group, or an organic group having a phenyl group, and m represents an integer of 1 to 6.

4. The method of bonding resin materials according to claim 1, wherein the oxymethylene-based polymer (B) comprises a repeating unit represented by formula (1) and is a copolymerized product of trioxane and one or more kinds of comonomers in an amount of 5.0 to 50.0 parts by mass with respect to 100 parts by mass of trioxane:

where $R^1$ and $R^2$ each independently represent a hydrogen atom, an alkyl group, an organic group having an alkyl group, a phenyl group, or an organic group having a phenyl group, and m represents an integer of 1 to 6.

5. The method of bonding resin materials according to claim 3, wherein the comonomers comprise at least one kind selected from the group consisting of 1,3-dioxolane and a derivative of 1,3-dioxolane, 1,3-dioxepane and a derivative of 1,3-dioxepane, 1,3,5-trioxepane and a derivative of 1,3,5-trioxepane, 1,3,6-trioxocane and a derivative of 1,3,6-trioxocane, and a monofunctional glycidyl ether.

6. The method of bonding resin materials according to claim 1, wherein the resin material (X) is an injection-molded article, an extrusion-molded article, a stretch-molded article, or a molded article obtained by secondary processing of the injection-molded article, the extrusion-molded article or the stretch-molded article.

7. The method of bonding resin materials according to claim 1, wherein the low-melting-point oxymethylene-based polymer (B) has a continuous layer shape or a discontinuous domain shape and is placed on a surface of the resin material (X) in advance of the heat treatment.

8. A structure obtained by the bonding method according to claim 1.

9. The method of bonding resin materials according to claim 1, wherein the resin material (Y) is a low-melting-point oxymethylene-based polymer (B) having a melting point lower than the melting point of the oxymethylene-based polymer (A) by 5 to 50° C.

10. The method of bonding resin materials according to claim 1, wherein the resin material (Y) is a material identical to or different from the resin material (X) and the low-melting-point oxymethylene-based polymer (B) is provided between the resin material (Y) and the resin material (X).

11. The method of bonding resin materials according to claim 10, wherein the resin material (Y) is a material identical to the resin material (X).

12. The method of bonding resin materials according to claim 10, wherein the resin material (Y) is a material different from the resin material (X).

* * * * *

UNITED STATES PATENT AND TRADEMARK OFFICE
CERTIFICATE OF CORRECTION

PATENT NO. : 8,617,345 B2  
APPLICATION NO. : 12/517418  
DATED : December 31, 2013  
INVENTOR(S) : Akira Okamura et al.

Page 1 of 1

It is certified that error appears in the above-identified patent and that said Letters Patent is hereby corrected as shown below:

On the title page, Item (86), the PCT Information is incorrect. Item (86) should read:

--(86)  PCT No.:     PCT/JP2007/073343

§371 (c)(1),  
(2), (4) Date:     Sep. 22, 2009--

Signed and Sealed this  
First Day of April, 2014

Michelle K. Lee  
*Deputy Director of the United States Patent and Trademark Office*